United States Patent [19]

Krumhansl

[11] Patent Number: 4,655,252

[45] Date of Patent: Apr. 7, 1987

[54] VALVES

[76] Inventor: Mark U. Krumhansl, 1811 Bent Twig, Tustin, Calif. 92680

[21] Appl. No.: 229,637

[22] Filed: Jan. 29, 1981

Related U.S. Application Data

[63] Continuation-in-part of Ser. No. 133,636, Mar. 24, 1980, abandoned.

[51] Int. Cl.$^4$ .................. F16K 11/085; F16K 27/00; F16K 5/04
[52] U.S. Cl. .............................. 137/595; 137/625.47; 137/269; 251/367; 251/59; 251/14; 251/120
[58] Field of Search .................. 137/595, 862, 625.47, 137/884, 269; 251/367, 59, 14

[56] References Cited

U.S. PATENT DOCUMENTS

| | | | |
|---|---|---|---|
| 1,244,552 | 10/1917 | Shelor | 137/595 X |
| 1,270,722 | 6/1918 | Gillette | 137/595 |
| 2,145,132 | 1/1939 | Riney et al. | 137/625.47 X |
| 2,766,771 | 10/1956 | Wenzel | 137/595 |
| 3,233,865 | 2/1966 | Panzica et al. | 137/625.47 X |
| 3,489,178 | 1/1970 | Kice | 137/625.47 X |
| 3,595,270 | 7/1971 | McNeal, Jr. | 137/595 |
| 3,938,553 | 2/1976 | Ortega | 137/625.47 |

FOREIGN PATENT DOCUMENTS 861982  3/1961  United Kingdom ................ 137/884

Primary Examiner—Arnold Rosenthal
Attorney, Agent, or Firm—Grover A. Frater

[57]        ABSTRACT

Valve bodies that are generally cylindrical and are open at top and bottom are combined with flow diverters which may be combined top to bottom to permit stacking of a combination of valves for actuation together without need for separator walls between valves. These elements, together with special adapters and end plates, permit economical manufacture of a series of manually or hydraulically actuated single and multiple function valves. These and other valve body and valve element forms and flow elbows are rendered more useful by the inclusion of seal retaining elements and flow turners.

6 Claims, 26 Drawing Figures

VALVES

CROSS-REFERENCE TO RELATED APPLICATION

This application is a continuation-in-part of application Ser. No. 06/133,636 which was filed Mar. 24, 1980, now abandoned.

TECHNICAL FIELD

This invention relates to improvements in valves and it relates in particular to improvements in features that permit economical construction of single and multiple function valves.

BACKGROUND OF THE INVENTION

The prospect of diminishing supplies of fossil fuel has prompted the development of means for utilizing solar energy collectors and heat pumps and heat storage reservoirs in system combinations that evoked little interest in the past. The development of the apparatus to build systems has been slow notwithstanding the fact that a very great body of the required technical information is available. There are sensing techniques and microprocessors and servo technology with which to design a wide range of energy efficient heating and cooling systems, but there is a lack of "building blocks" with which to turn designs into operating systems.

A major problem has been the fact that systems must be customized. The combined solar and gas fired heating system for a home on the east side of the street that has no swimming pool must be substantially different from that of the home that has a heat and cold storage reservoir in the form of a swimming pool, or which is located on the west side of the street where a solar collector can take greater advantage of afternoon sunshine.

The lack of system uniformity has been a problem for manufacturers of systems components. The result is that components are expensive, and components that will interfit properly to create a system are sometimes difficult to find. Valves are among the components that have been difficult. In general, systems that combine solar and gas or oil fired heating must operate at very low pressure. Adequate flow rates are achieved only with fairly large diameter flow conduits and large values. There are few large capacity, chemically inert, corrosion resistant, low pressure loss valves for controlling fluid flow. The cost of large brass valves destroys the cost effectiveness of systems of even modest complexity. What has been needed are non-restrictive flow control valves of large capacity which are capable of low cost manufacture without sacrifice of the qualities that ensure the years of trouble-free service that must be achieved in practical systems.

Energy transfer is not the only field in which there is a pressing need for improved valves and for stackable valves, in particular. The chemical processing industries, the food and beverage processing industries, the farming industries, the electroplating industries, and many others, have a need for improved low cost valves, especially high capacity and low pressure valves.

SUMMARY OF THE INVENTION

It is an object of the invention to provide improved valves.

Even more, it is an object to provide valves whose features permit a commonality of design in a variety of valves. It is an object to provide a family of valves whose parts are interchangeable whereby to minimize production and tooling costs and warehouse and installation costs.

It is also an object to provide valves which can be stacked, sandwich-like, for actuation together by a single actuator. A related object is to provide valve designs which permit valves having different functions and flow arrangements to be stacked and actuated together.

Valves made according to the invention may be produced in metal or in plastic, or in a combination of metal and plastic. They may be produced in the form of flow reversing valves, by-pass valves, shut-off valves, and three-way valves. They may be produced in large sizes, two-inch diameter flow paths and larger for low pressure applications at a cost far less than the cost of producing previous water flow control valves of the same capacity. To provide those advantages is another object of the invention.

These and other objects and advantages of the invention, which will become apparent in the description that follows, are realized in part by a unique valve body structure which surrounds a cylindrical valve cavity that is completely open at top and bottom. That feature is combined with a special means for interconnecting two or more valve bodies which may or may not have different porting arrangements. The valve bodies are stacked without need for separators. A unique structural arrangement permits stacking of flow diverters or valve cores independently of the valve bodies. Thus, instead of stacking individual separate valves, the invention permits separate stacking of valve bodies and of valve cores for subsequent assembly into composite, stacked valve units.

Top and bottom covers are arranged to position a diverter stack properly within a valve body stack without need for separators and spacers between valves. That advantage is achieved in part by the provision of special valve sealing structures.

An hydraulically powered valve actuator complements the valve body and diverter designs. An interface adapter permits use of the adapter with any of the valves of the family alone or in any combination. It employs the special sealing arrangement.

A further object is to provide improved seals and seal retainers for valves of the kind described above and for valves in general.

A still further object is to provide a valve body in which insulating air spaces can be, and are, formed.

Also, because system improvement requires a reduction in system flow resistance as well as improved valves, it is an object to provide improved flow elbows and a method for making them.

THE DRAWINGS

DETAILED DESCRIPTION OF THE INVENTION

Figure 1:
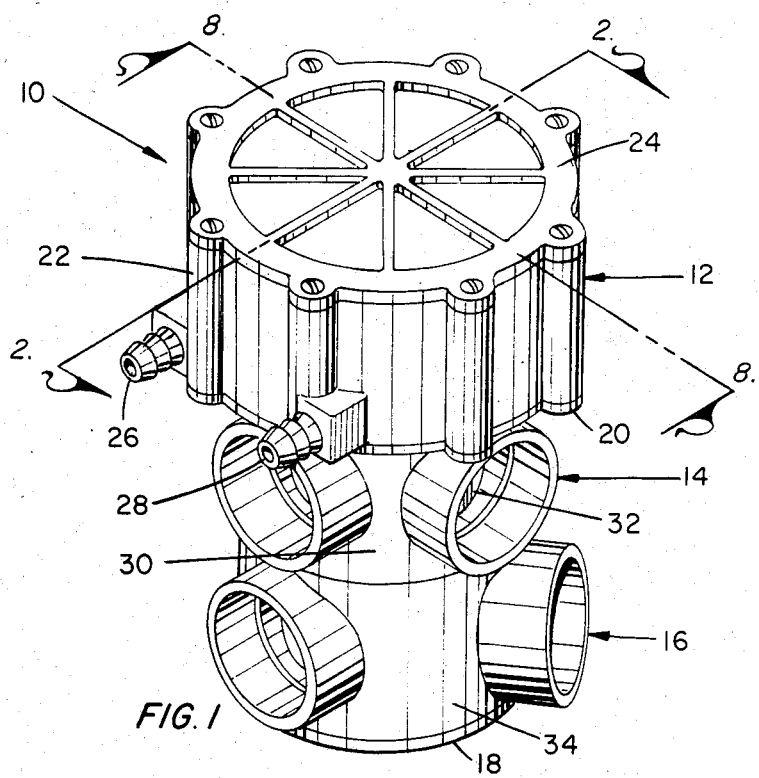
FIG. 1 is an isometric view of a valve and valve actuator set which embodies the invention.

The actuator and valve assembly, which is generally designated 10 in FIG. 1, includes an actuator 12, a four-port valve 14, and a three-port valve 16. A bottom cover 18 closes the lower end of the assembly at valve 16. The member 20 is called an adapter plate. It serves as the upper cover for the valve set that is formed by the fourport and three-port valve combination, and it is the means by which the valve set is attached to the actuator. The body 22 of the actuator includes both a side wall and a bottom wall. The numeral 24 designates the cover of the actuator. A rotor that is housed within the actuator, but is not visible in FIG. 1, is caused to rotate by flow of fluid into and out of the two flow ports 26 and 28 that are formed in the actuator body.

The four-port valve 14 includes a cylindrical housing 30 and a valve diverter core 32 a portion of which is visible through one of the four ports. The cylindrical body of the three-port valve 16 is designated 34. It houses a valve core which is not visible in FIG. 1.

The two valve bodies connect directly one to the other to form a unitary member having a cylindrical cavity which extends on a common axis through both of the valve housings. The two valve cores or flow diverters are interconnected one with the other and may be removed as an assembly when the adapter plate 20 is removed. Thus, there is no separator between the valve bodies or the valve flow diverters. The valve core or diverter structure is arranged so that there is no flow from the interior of one valve to the interior of the other valve.

Figure 2:
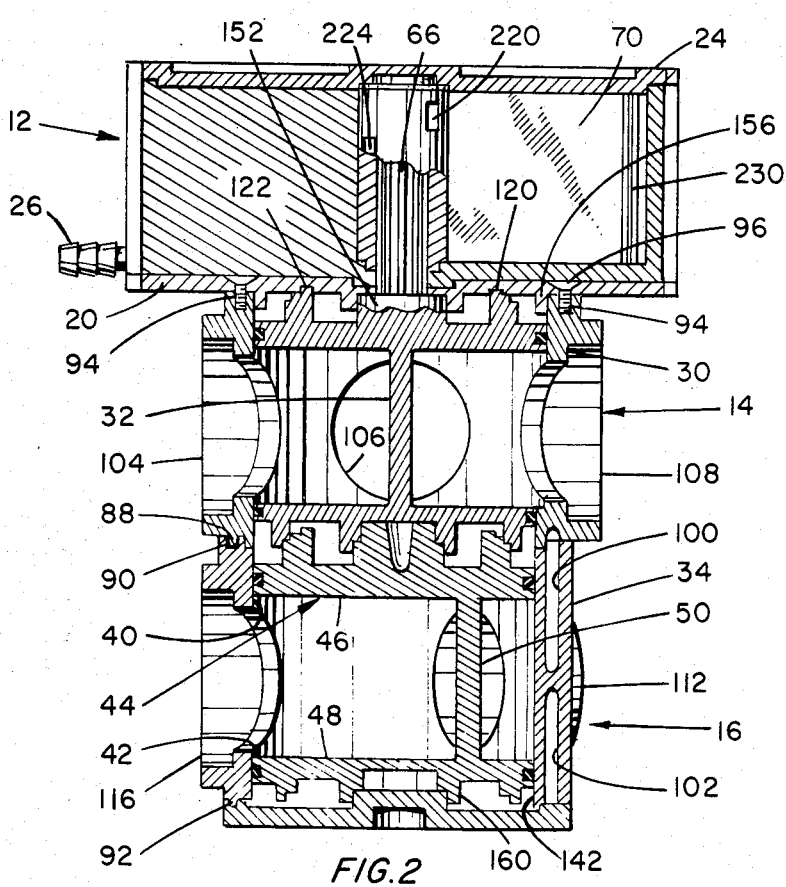
FIG. 2 is a vertical cross-section of the valve and actuator set of FIG. 1 taken on line 2—2 in the case of the actuator and the center plane that contains the central axis and is parallel with the paper in the case of the two valves.
Figure 4:
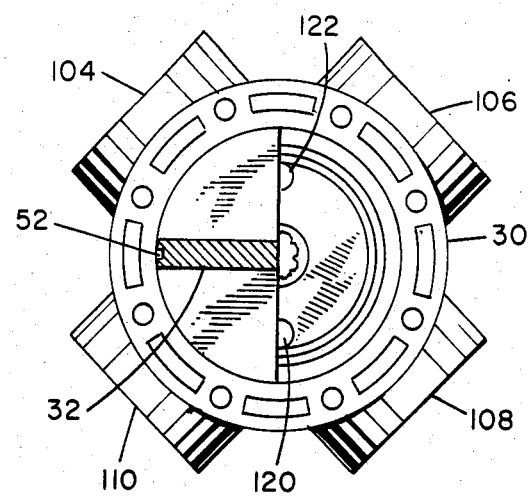
FIG. 4 is a top plan view of the four-port valve of FIG. 1 in which the diverter is shown partly in section.
Figure 5:
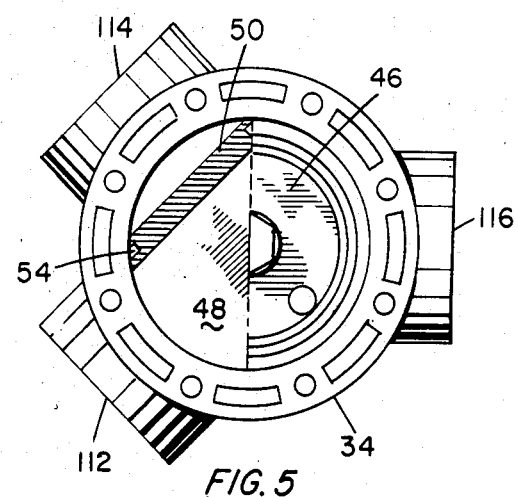
FIG. 5 is a top plan view of the three-port valve of FIG. 1 with its diverter, the diverter illustrated in FIG. 3, shown partly in section.
Figure 6:
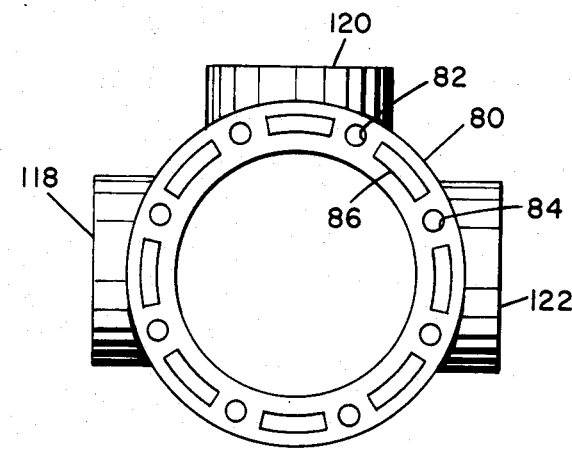
FIG. 6 is a top plan view of an alternative form of three-port valve the valve core of which has been removed.

The arrangement by which that is accomplished can be understood by a comparison of FIG. 2 with FIGS. 3, 4, 5, 6 and 15. Except for the placement of the ports, all of the valve bodies are alike, and, as is best shown in FIG. 6, the body of the valve defines a central cylindrical bore which extends completely through the body.

Returning to FIG. 2, the several ports of the valve are circular openings the axes of which are perpendicular to the central opening of the valve body and which intersect that central axis at a point substantially midway between the upper and lower ends of the valve body. While the port openings are large, there is a wall section near the upper and the lower end of the valve body in which the interior surface of the valve body is an unbroken cylinder.

For identification, the unbroken cylindrical portion at the upper interior of the three-port valve is designated 40, and the lower interior unbroken cylindrical portion is designated 42. The valve cores are formed as a pair of discs which are rotatable about an axis that is concentric with the axis of the housing. The two discs are positioned so that one is disposed in the upper unbroken cylindrical region of its housing, and so that the other disc is disposed in the lower unbroken cylindrical region of the housing.

In the case of the core of the three-port valve, which core is designated 44, the upper disc is designated 46 and the lower disc is designated 48. The valve core 44 and the upper disc 46 and lower disc 48 are shown in perspective in FIG. 3.

In FIG. 5, the upper face of the upper disc 46 is visible at the right, and the upper face of the lower disc 48 is visible at the left. Those discs include a sealing member by which a seal is effected with the interior surface of the valve housing so that flow in each valve is confined between the upper and lower disc of its valve core. The upper and lower discs are interconnected by a flow diverter which, in the case of the core 44, is numbered 50.

Figure 10:
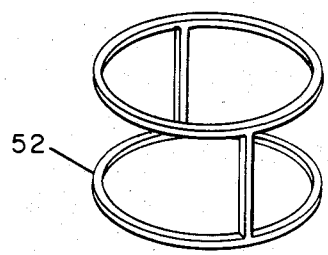
FIG. 10 is an isometric view of the sealing member that is employed with the valve diameter of the four-port valve of FIG. 1.

In the preferred embodiment, the sealing member that encompasses the upper disc 46 and the lower disc 48 is formed integrally with a sealing member that extends along the outer surface on both sides of the flow diverter. The result is a unitary sealing member similar to the sealing member 52 of FIG. 10. The one shown in FIG. 10 is the sealing member for the valve core of the four-port valve. Its flow diverter lies on a plane that contains the rotational axis of the core. That is shown in FIGS. 2 and 4. The flow diverter 50 of the core 44 is parallel to the plane that contains the rotational axis, but it is offset to one side of that plane so that the portions of the seal 54 (see FIG. 3) that extend between the upper and lower rings are not arranged diametrically as in the case of the seal shown in FIG. 10. Otherwise they are the same. They are made of a material that has sufficient resilience so that they can be stretched and assembled on their respective valve cores where they reside in grooves made to receive them and provide a positive seal.

Figure 3:
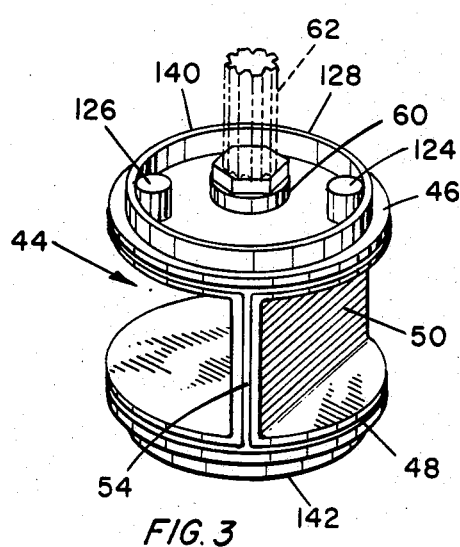
FIG. 3 is an isometric view of the valve core of the three-port valve of FIG. 1.

In FIG. 3, the diverter is shown to have an upwardly extending stem generally designated 60. The stem extends along the axis of the unit from one end of the upper disc 46. An extension of that stem is shown in dotted lines to indicate that the preferred arrangement is to form that operating stem with the octagonal extension 62 with an oriented key way. All of the valve cores may be made with the octagonal extension so that each can be made the core of the valve adjacent the actuator in the case of a series of stacked valves. The keyed stem is engaged with the rotor 70 of the actuator 12, in FIG. 2, when the hydraulic actuator is used, or with the handle of FIG. 11 when the valves are to be operated manually. That arrangement is shown in FIG. 2 where the keyed extension 66 of the valve core 32 is shown to extend into the hydraulic actuator 12 where it engages the rotor 70.

However, the keyed extension has been removed from the valve core 44 as best shown in FIG. 2 for stacked applications.

Figure 7:
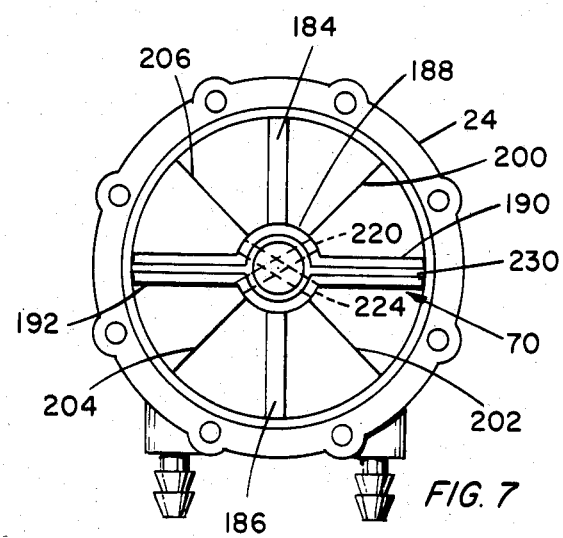
FIG. 7 is a bottom plan view of the cover of the actuator of FIG. 1 together with its rotor.
Figure 25:
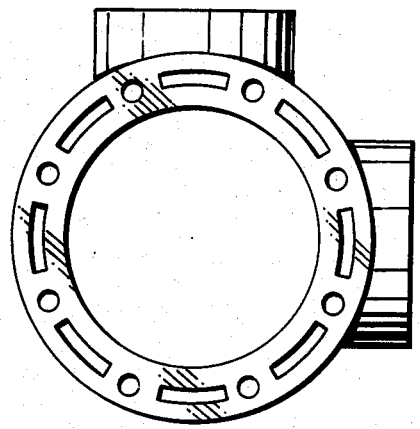
FIG. 25 is a top plan view of a two-port, L-shaped valve body according to the invention.

In the interest of increased visibility, the valve cores in FIGS. 4 and 5, and the rotor in FIG. 7, have been positioned differently than they are shown to be in FIG. 2. Also, the cross-sectional view of FIG. 2 has been taken on a line that meanders in small degree from the central vertical plane to permit illustration of the structural arrangement for interconnecting the valve bodies with one another and with the adapter plate 20. That interconnection arrangement is described as follows. In FIG. 6, the valve body 80 is shown to be formed with circular recesses such as the recesses 82 and 84 between which there is a generally rectangularly shaped recess opening 86. The construction of the valve bodies 30 in FIG. 4, and 34 in FIG. 5, and body 212 in FIG. 15, and the one shown in FIG. 25, is substantially the same. If the housing of FIG. 6 was turned over so that its bottom side was visible, the appearance would be substantially the same except that, instead of circular recesses, the bottom face is provided with circular bosses. The bosses are aligned with the recesses so that the boss on the underside of one valve housing will fit within the recesses of the upper surface of an adjacent valve housing. Thus, in FIG. 2, the boss 88 of valve body 30 indexes and fits into and is welded in place in a recess 90 in the upper face of valve body 34. Similarly, a boss 92 at the lower face of valve body 34 fits within and is welded in a recess in the upper face of the bottom plate 18. However, at the intersection of adapter plate 20, and the upper face of valve body 30, a different arrangement is used. In this case, cylindrical, internally threaded inserts, such as the insert 94, are welded into the recesses of the valve body. The adapter plate is secured to the valve body by a number of flat headed machine screws that screw into respectively associated ones of those inserts. One of the machine screws has been numbered 96 for identification purposes.

The rectangular shaped recesses which occur between ports, like recess 86 of FIG. 6, are illustrated in cross-section in FIG. 2. Here there are two such recesses. One is formed in the upper face of the valve housing and is numbered 100, and the other is formed in the lower face of the housing and is numbered 102. In the region of the ports those recesses are less deep, of course. Also, in this embodiment, the recesses that occur between ports are, in fact, tapered bosses that extend entirely through the wall of the body to an opening in the center of the boss at the other end of the body. The primary purpose of these openings is to facilitate the plastic molding process in which better quality is achieved when wall thicknesses throughout the part are relatively uniform and produce stronger parts. They also reduce the amount of material required to make the housing and they form dead air spaces which serve to thermally insulate the valve.

Figure 15:
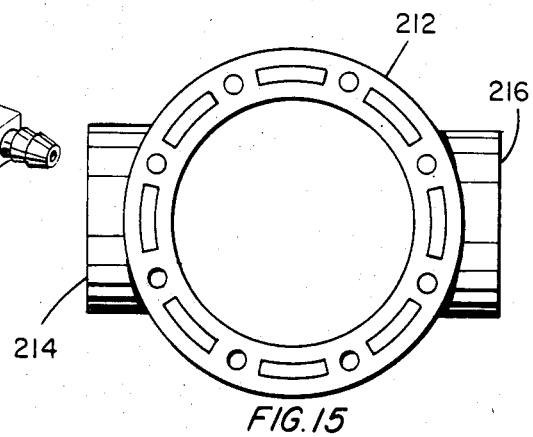
FIG. 15 is a top plan view of a two-port valve body which embodies the invention.

Since the recesses and bosses are uniformly spaced around the circumference of the valve bodies, and the bottom plate, and since the flat headed machine screws are similarly arranged, it will be apparent that the valve housings can have any of a number of different relative orientations one to the other. The valve cores can also be rotated relative to one another about their common axis in increments of forty-five degrees so that the diverters will be effective to control flow in selected fashion at each of the valve ports. To facilitate identification, the ports of the four-port valve have been numbered 104, 106, 108 and 110, respectively. The ports of the three-port valve have been numbered 112, 114 and 116, respectively. The ports of the three-port valve housing of FIG. 6 includes ports 118, 120 and 122. In FIG. 15, the ports of the two-port valve are designated 214 and 216, respectively. In FIG. 25, the ports of the L-shaped valve are numbered 502 and 504, respectively.

No top or bottom plan view of the bottom plate 18 has been shown because, in the case of each of them, the upper and lower surfaces are symmetrical about its central axis. Each of the conformations shown, except the recess holes that are spaced around the upper surface and which were previously described, would appear only as concentric circles in a top or a bottom plan view. Similarly, a bottom view of the valve diverter cores has not been shown because the core bottom is symmetrical around the rotational axis of the core except that the central opening is formed as an octagonally shaped recess in the metal applications. The other conformations that are visible in FIGS. 2 and 3 would simply appear as circles in a bottom plan view. The same thing is true of the upper surface of the valve cores, with two exceptions. One of those exceptions is the keyway arrangement at the extension of the valve diverter core stem. The keyway is not uniformly arranged. Formed of an octagonal base, it is shaped as the inverse of the shape of the stem receiving opening in the handle. Thus, the arrangement of the handle spline may be understood from an examination of FIG. 11.

Figure 13:
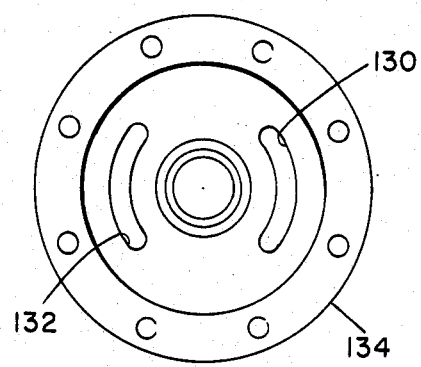
FIG. 13 is a bottom plan view of the cover plate of FIG. 12.

The other exception is that there are two diametrically positioned circular bosses that extend upwardly from the upper surface of each valve core. In the case of the valve core of the four-port valve those bosses are numbered 120 and 122, respectively (see FIG. 2). In the case of the valve core 44 the two bosses are numbered 124 and 126, respectively (see FIG. 3). Those two diametric bosses extend into the arcuate slots 130 and 132 which are formed in the lower face of the cover plate 134 which is shown in FIG. 13 and is used when actuation is accomplished with the handle of FIG. 11 rather than with the actuator 12 that is shown in FIGS. 1 and 2. The purpose is to limit handle rotation to ninety degrees of arc, and to that end each of the arcuate slots extends through an arc of ninety degrees.

As best shown in FIG. 3, a concentric ring stands upwardly from the upper disc of the valve core. In the case of valve core 44, that upper ring is identified with the reference numeral 140. A similar ring 142 extends downwardly from the lower disc 48 of the core. The corresponding lower ring of the core 32 of the four-port valve is numbered 144. It will be seen at the junction of the two valve cores in FIG. 2 that the ring 140 of core 44 fits within the lower, outer ring 144 of core 32. When the ring 140 is inserted into the ring 144 the stem 60 of core 44 fits into a recess in the lower face of the core 32. The ring 144 ends in a shoulder against which the upper rim of ring 140 rests. When the two are interfitted the valve cores are in proper alignment and they are properly spaced for assembly together into the stacked valve housing. The upper valve is positioned properly with the aid of a somewhat different structure. There is a shoulder 152 that extends around the base of the stem 66 of the core 32. That shoulder fits into a conformation in the lower face of the adapter plate 20. A combination of the shoulder and that receiving conformation serves to position the valve core so that it axis is coincident with the central axis of the hydraulic actuator 12. The conformation that fits against the shoulder 152 is a part of the adapter plate. The adapter plate is positioned relative to the valve housing first by having its lower face pressed flush against the upper end of the valve housing 30, and second, it is positioned laterally by a ring 156 which extends down from the adapter face into the cylindrical bore of the valve housing. At the lower end of the bottom valve housing the upper face of the bottom plate fits flush against the lower face of valve housing 34. The inner ring 160 surrounds the upwardly extending boss at the center of the bottom plate which corresponds in shape to the valve core stems. The ring 142 at the lower end of housing 102 interfits with a circular conformation near the perimeter of the bottom plate to center the latter relative to the housing. A similar ring at the lower end of housing 30 interfits with a conformation in the upper face of housing 34 to ensure alignment of the two housings on their common central axis.

Figure 8:
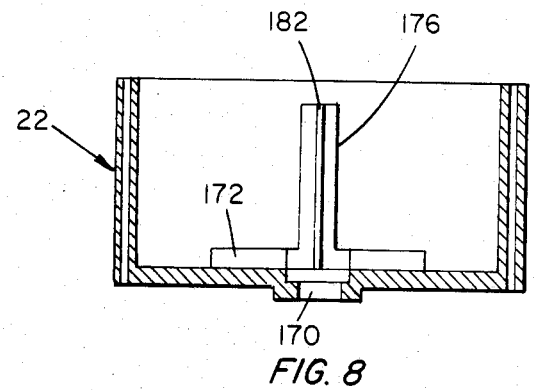
FIG. 8 is a cross-sectional view of the body of the actuator taken on line 8—8 of FIG. 1.
Figure 12:
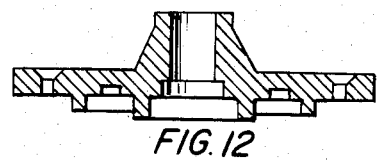
FIG. 12 is a view in vertical, central cross-section of an upper cover plate which is employed when the handle is substituted for the actuator.

The valve actuator is formed by the actuator housing 22, its cover 24, and the rotor 70. The housing 22 is shown in vertical cross-section in FIG. 8. Opening 170 in the bottom wall accommodates the stem of the core of the valve that is positioned adjacent the actuator. The numeral 172 identifies a wedge shaped raised floor that extends up from the bottom wall 174 and is formed integrally with it. In the central region of floor 172 a wall 176 extends upwardly to near the full height of the body. It serves as a divider whose purpose is to divide the interior of the housing into two cavities. The sides of the wedge shaped, raised floor 172 serve as stops to limit movement of the actuator rotor. The upper surface of the wall 176 is numbered 182. That surface fits into recess 184 which is seen in FIG. 7 to be formed in the lower face of the actuator cover. There are two such walls in the actuator body. The other one fits into recess 186 of FIG. 7. When the rotor 70 is in place, as it is shown to be in FIG. 7, and when the cover of FIG. 7, the wall 176 of the body, and the wall on the other half of the body, combine with the grooves 184 and 186 and with the exterior surface of the central hub section 188 of the rotor they divide the actuator housing into two chambers. Rotor vane 190 at one side of the hub is disposed in one of the two chambers. The vane 192 at the other side of the hub is disposed in the other of those two chambers. The wedge shaped raised area 172 that is visible in FIG. 8 is reproduced at the lower surface of the actuator cover. The shape in plan view is indicated in FIG. 7. In FIG. 7, both sets of actuator bottom stops are shown, and the several stops are numbered 200, 202, 204 and 206.

The vanes 190 and 192 extend into the two cavities that are formed by the dividing wall that fits into recesses 184 and 186 of FIG. 7. Each of the vanes divides its respectively associated cavity into two cavities one on each side of the vane. Diagonal vanes are interconnected by openings that extend through the hub of the actuator rotator. Those interconnecting passageways are indicated by dotted lines in FIG. 7. The openings themselves are visible in FIG. 2. One of them is designated 220, and the other is numbered 224.

Figure 14:
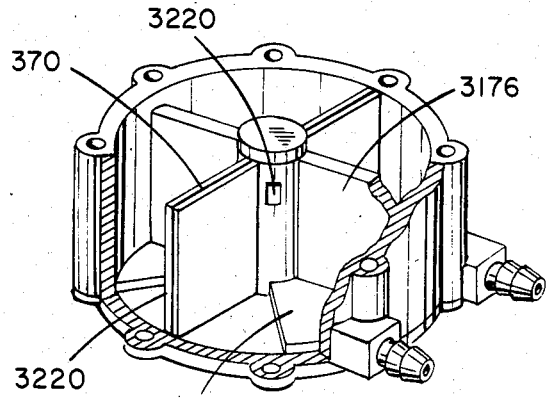
FIG. 14 is a schematic diagram illustrating features of the hydraulic actuator.

The diagram of FIG. 14 illustrates the construction of the actuator in a perspective showing. The numeral 3 has been added to the reference numeral of the corresponding part in the other figures of the drawing to facilitate relating them to the schematic.

It will be apparent that the three-port valve body of FIG. 6, and the two-port valve bodies of FIG. 15 and FIG. 25, can be sutstituted for the three-port valve body of FIGS. 1 and 2. If that substitution is made, then the valve core with the diverter at its center plane could be substituted for the valve core shown in FIG. 3. Further, it will be apparent that any reasonable number of valves may be stacked one adjacent the other with a variety of port orientations without any need to provide separator walls between the valves.

Figure 11:
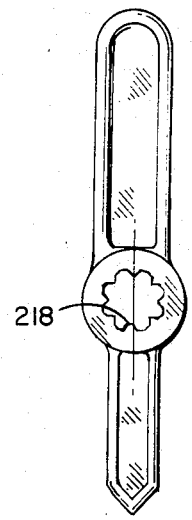
FIG. 11 is a top plan view of an operating handle that may be substituted for the actuator of FIG. 1.

In FIG. 11 the handle opening is made octagonal in cross-section to receive the upper end of the valve core stem. The spline is formed in the octagonal opening is arranged to mate with the keyway formed on the octagonal surfaces of the core stem. The keyway of the valve core stem is arranged on the octagonal shape, and is arranged symmetrically relative to its respective spline except that it is offset. The core with the midplane diverter has its offset keyway oriented differently than the offset keyway of the core with the offset diverter. In the handle, the spline 218 is offset. The handle can be assembled only with a proper orientation relative to the diverter of the valve core to which it is attached. It cannot be assembled except one side up on the stems of the midplane diverter core, and the handle must be turned over before it can be assembled on the stem of the offset diverter core. That arrangement ensures assembly of the handle so that handle position is properly indicative of the position of the diverter of the valve.

The use of the octagonal shape for the core stems and for the recesses in which those stems are received permits orientation of cores to one another in forty-five degree increments, and no limitation is imposed on that orientation by the offset keyways and splines. One of the keys to the success of this design is that all of the sealing is accomplished with seals that encompass and surround the moveable elements. In the case of the valve cores, that seal extends around both the upper and lower discs and along the edges of the diverter. That arrangement is made feasible notwithstanding that the diverter sides are rotated past the port openings and against the inner housing wall many times during the lifetime of the valve because the seal is formed integrally and is held in place by its resilience. Throughout the length of the sealing member it is disposed in grooves formed in the disc and diverter sections of the valve cores. In each case, the seal embraces the part being sealed, and it tends to contract in a way that forces it to remain within its retaining groove.

Figure 9:
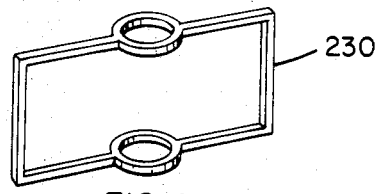
FIG. 9 is an isometric view showing the seal that is employed with the rotor that is housed within the actuator of the unit of FIG. 1.

A similar seal, seal 230 of FIG. 9, is employed in the valve actuator. Circular portions embrace the central core of the rotor at its ends, and other portions extend around the periphery of the rotor vanes.

The sealing element of FIG. 10 can be characterized as comprising an upper annulus and a lower annulus that are interconnected by sealing members that extend between them at spaced point around the periphery of the annular portions. An examination of FIG. 10, and some of the other figures, particularly FIGS. 2, 3, 4 and 5, will make it apparent that the sealing members connecting the annular portions bear against the cylindrical inner wall of the valve housing except when the diverter or valve element has been rotated so that that sealing member lies opposite one of the ports. Under certain conditions, especially as the valve begins to open and when it is almost closed, the movement of fluid past the seal exerts force tending to dislodge the seal from its mounting. While it is possible to design a seal and to employ sealing materials that can withstand those forces and which present no significant reliability problem in the field, it is possible to incorporate in the valve design a seal retaining structure that is very inexpensive and has the added advantage of minimizing resistance to flow through the valve. Incorporation of that feature permits the use of a wider range of sealing materials and more dimensional latitude in their manufacture.

Figure 18:
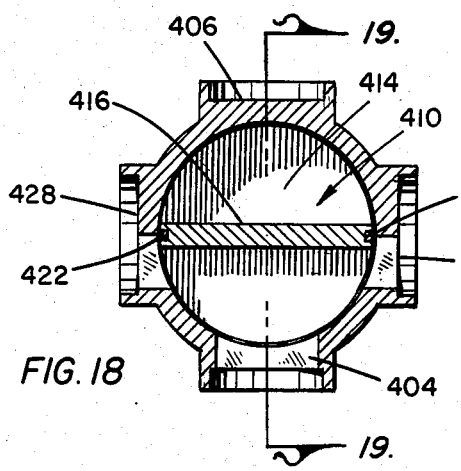
FIG. 18 is a cross-sectional view taken on line 18—18 of FIG. 17.
Figure 17:
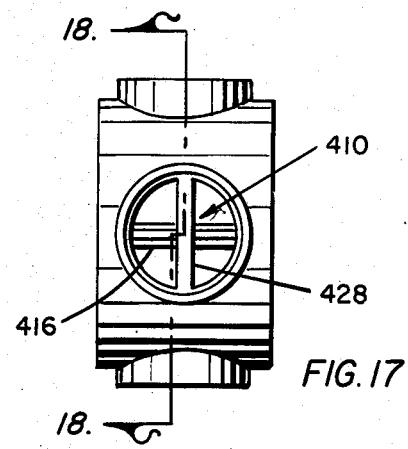
FIG. 17 is a view in elevation of the valve of FIG. 16 looking through two of the ports.
Figure 16:
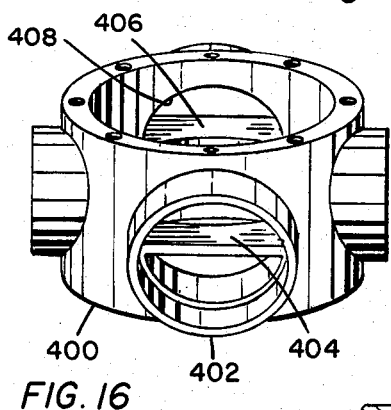
FIG. 16 is an isometric view of a four-port valve body modified to include a seal retainer in each of its port openings.
Figure 19:
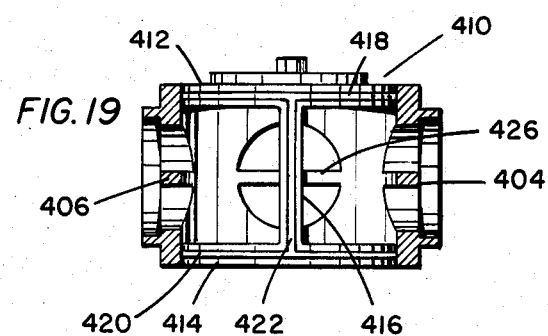
FIG. 19 is a cross-sectional view taken on line 19—19 of FIG. 18.
Figure 26:
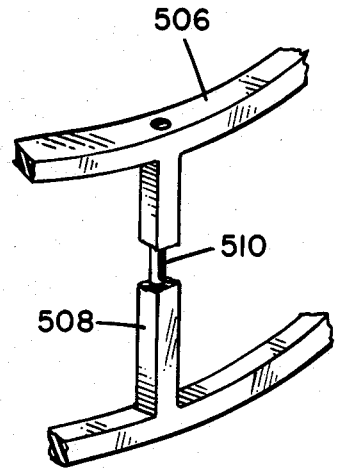
FIG. 26 is an isometric view, partly in section, of a fragment of a sealing member of alternate form.

One form is depicted in FIG. 26 which illustrates a portion of a seal 506 which, except for inclusion of a stiffening means in the interconnecting arms of the seal, is like the seal 52 of FIG. 10. FIG. 26 depicts only one arm, 508. Part of the arm has been cut away to expose a metal stiffener pin 510 which extends over the full length of the arm. In another variation, four seal retainers are incorporated in the four-port valve housing 400 shown in FIG. 16. The seal retainer in the forward port 402 is numbered 404. The seal retainer 406 extends across the port opening 408 and is only partly visible. The flow diverter is not shown in the body in FIG. 16. It is omitted for the sake of clarity. The diverter is shown in FIGS. 17, 18 and 19 where it is identified by the reference numeral 410. It is similar to the diverter shown in FIG. 3 except that the diverter wall extends through the axis of rotation. It comprises an upper disc 412, a lower disc 414, and the diverter wall 416 which extends on the rotational axis of the unit between the upper and lower discs. As in the case of the previously described diverters, this one includes an annular seal 418 which extends around the periphery of the upper disc. The seal includes a lower annulus 420 which extends around the periphery of the lower disc. A sealing member 422 is mounted in grooves in the diverter wall and is visible in FIG. 19. It is visible, too, in FIG. 17, and the corresponding sealing member 424, at the opposite edge of the diverter wall, is visible in the cross-sectional view of FIG. 18.

One purpose of the seal retaining elements is to provide a surface against which the midregion of the sealing members 422 and 424 can bear when they are being rotated past port opening as an incidence to valve diverter rotation. Each of the port openings of the body is provided with such a seal retainer. All of them are visible in FIG. 18. The retaining members 404 and 406 are visible along with retaining members 426 and 428. In FIG. 18 the diverter wall 416 is shown to have been rotated to a position in which the diverter wall has its ends facing two of the port openings. Ordinarily, the valve diverter is rotated so that the edges of the diverter wall 16, and the seals 422 and 424, are positioned between port openings. However, when the valve condition is changed, the diverter must be rotated and the edges of the diverter wall past the port openings. In the absence of the seal retainers 404, 406, 426 and 428, the sealing members 422 and 424 would be substantially unsupported in their midregion as they were rotated past the port openings. Each of the seal retainers span its associated port opening, preferably in a plane that is perpendicular to the axis of rotation of the diverter, but in any event so that the seal member is supported at some point in its midregion at every angular position as it passes each port. To that end the inner wall of the seal retainers is arcuately shaped on a radius that equals the radius of the cylindrical inner wall of the valve housing. Thus, the inner surface of the several seal retaining elements form part of the inner cylindrical, or substantially cylindrical, wall of the valve housing.

Since one of the functions of the seal retainer is to provide a surface against which the seal will bear, and thereby be held or retained in the seal retaining groove, the member should have sufficient strength so that it will not yield but will provide adequate support for the seal.

A second purpose for the seal retainer is to aid in minimizing the amount of turbulence that is developed in the fluid as it passes through the valve. To best serve that purpose the seal retainer is formed as a relatively thin vane that spans the port opening on a plane that extends through the axis opening. That the seal retainers are constructed in that fashion in this preferred embodiment is best shown in FIGS. 17 and 19. These valves are made of a plastic material and are designed for assembly with plastic pipe using solvent materials. The diameter of the port openings is enlarged at the outer end of the port to receive the end of a pipe. In this preferred embodiment, the outer surface of the several seal retainers is flush with the shoulder that results from the change in inside port diameter. That construction is preferred for practical reasons.

Figure 20:
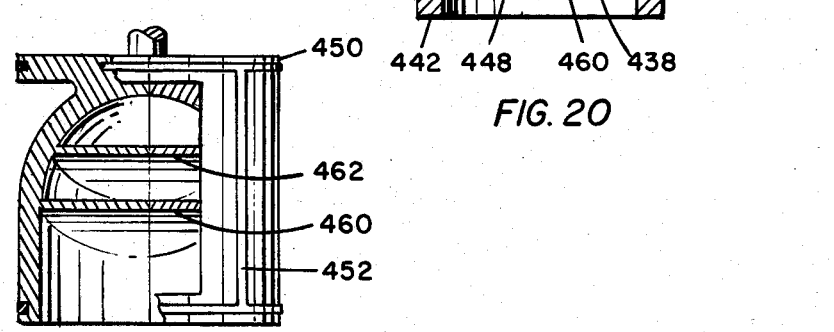
FIG. 20 is a cross-sectional view taken on the vertical center plane of an alternative form of valve which incorporates seal retainers in some of its flow openings.

The valve shown in FIG. 20 is similar in that it is formed with a housing that is generally cylindrical, or at least that has a valve cavity whose inside walls are generally cylindrical. As in the case of the valve housing of FIGS. 16 through 19, this valve housing 434 has an opening in the lower end of the cylindrical housing which communicates with the cylindrical valve chamber. The valve element 436 in that chamber includes cylindrical end members which are interconnected by a diverter wall that extends from one end portion to the other, to form a rigid assembly which can be rotated with the handle 440.

One version of the valve element can be described as being cylindrical, with its upper end closed, and having a rectangular window formed in one wall. Ordinarily, flow proceeds into the lower port 442, into the lower opening of the flow diverter, and out the side window to one of the other of two side openings or ports 444 and 446, respectively. In that form the lower end of the valve member can be thought of as a lower annulus which is encompassed by an annulus sealing element 448. The upper part of the valve member can be thought of as a disc which is encompassed by a second annulus sealing member. In that form of valve element, the wall that interconnects the lower annulus and the upper disc is cylindrical except for the portion that is cut away to form the window. Two other lengths of the sealing member are secured to the outer wall of the valve member. Both of them extend from the lower sealing annulus to the upper sealing annulus, and one of them is positioned at each side of the window cutout.

Figure 21:
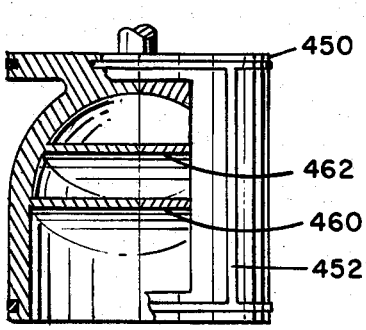
FIG. 21 is a view, partly in section, of the diverter of FIG. 20 as it appears when looking from the left of FIG. 20.

In this preferred form of valve member, the wall that interconnects the lower annulus with the upper disc is reshaped so that it retains its cylindrical form in that segment adjacent the edges of the window. The remainder of that wall is curved somewhat a pipe elbow to form a flow path for fluid entering at the body of the valve and exiting through the valve element window and one of the other of the side ports. That "elbow" or arcuate shape is depicted by the combination of FIGS. 20 and 21. For identification, in this preferred form, the lower sealing annulus has been numbered 448. The upper sealing annulus has been numbered 450, and that one of the interconnecting sealing members which is visible in FIG. 20, and also in FIG. 21, is numbered 452.

Turbulence, and therefore flow resistance, in this valve is further reduced by the inclusion of flow turning vanes which span the flow path opening through the valve element. Those elements are numbered 460 and 462 for identification. They are aero-dynamically shaped vanes or blades which extend across the elbow shaped cavity. They integrally formed with the wall of the valve element, and are curved to conform with the curvature of the wall of the valve element. Their inclusion greatly reduces the amount of turbulence and the resistance to flow that is encountered in their absence. The valve member is manufactured by molding it into two halves along the line that is perpendicular to the turning vanes 460 and 462, and which represents the midplane through the elbow-like portion of the valve element. That plane lies in parallel to the plane of fluid flow through the valve. In the preferred method of construction, the two halves are friction welded. In that process a layer of plastic material at the interface of the two parts is reduced to bondable form as a consequence of a micro motion induced by a sonic energy generator.

As in the case of the valves illustrated in FIGS. 16 through 19, the valve of FIG. 20 is fitted with a seal retaining element in each of its outlet ports. Element 464 spans port 446, and element 466 spans port 444.

Figure 22:
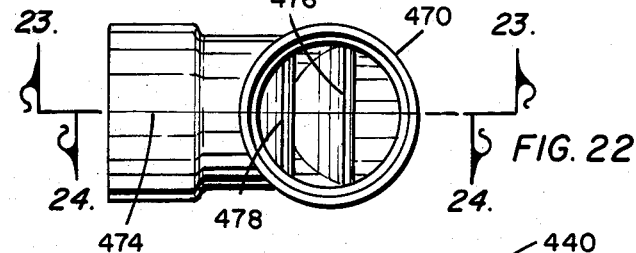
FIG. 22 is a view in end elevation of a pipe elbow according to the invention.

The use of flow turners and sonic energy bonding technique is not limited to elbow-like constructions that are found within valves. FIG. 22 is a view of what would be an ordinary plastic pipe elbow except for the inclusion of flow turning vanes in that portion of the elbow where flow direction is changed, and except for the fact that the finished unit is formed by bonding together two half units. The finished elbow 470 is shown in FIG. 22. Coupling sections at the ends of the elbow have larger inside diameter to receive connecting pipes, and at that region the outside diameter is increased. The line 474 is the parting line between the two halves of the elbow. That dividing line lies on the midplane through the elbow and in the plane of fluid movement through the elbow's two turning vanes, 476 and 478. FIG. 22 illustrates that those vanes span the inner opening of the elbow from one wall to the other.

Figure 23:
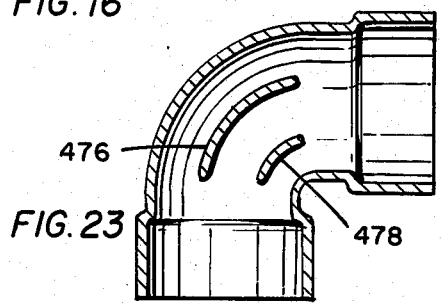
FIG. 23 is a cross-sectional view taken on line 23—23 of FIG. 22.
Figure 24:
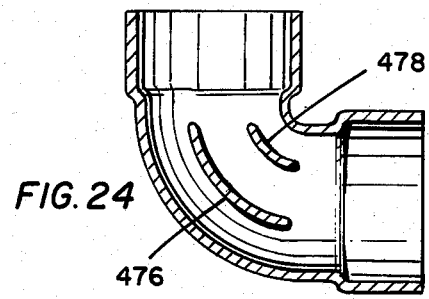
FIG. 24 is a cross-sectional view taken on line 24—24 of FIG. 22.

The shape of the vanes in the other dimension is illustrated in FIGS. 23 and 24. FIG. 23 shows the top half of the completed elbow, and FIG. 24 shows the bottom half of the completed elbow. The two halves are mirror images of one another, and the portions of the turning vanes 478 and 476 abut the portions of those vanes in the other half section when the two are assembled to the form shown in FIG. 22. In this preferred embodiment, the elbow halves are made of a plastic material. The two halves are bonded together along the outer walls of the two half sections and at the surfaces of the straightening vanes by the action of a sonic energy bonder.

Although I have shown and described certain specific embodiments of my invention, I am fully aware that many modifications thereof are possible. My invention, therefore, is not to be restricted except insofar as is necessitated by prior art.

I claim:

1. A valve comprising, in combination:
   a valve body defining a cylindrical valve cavity opening at an upper and a lower annular rim, at least two ports spaced around the periphery of said valve body and each affording communication to said cavity;
   a bottom cover having an upper face and a lower face;
   means in the form of a set of multilevel conformations alike in form and dimension at the upper face of said bottom cover and at said upper annular rim, and in the form of a set of multilevel conformations formed at the upper face of said bottom cover for closing the lower end of said cavity with said bottom cover; and
   a rotatable valve core disposed in said cavity and comprising upper and lower spaced disks having axes substantially coincident with the axis of said cavity and an interconnecting wall extending parallel to the axis of the cavity into engagement, at its edges, with the wall of the cavity whereby, in at least one rotational position, said interconnecting wall forcloses communication through said cavity from one of said ports to another.

2. The invention defined in claim 1 which further comprises sealing means for effecting a substantial seal against the passage of fluid from the space between said discs to the regions between said discs and said upper and lower covers.

3. The invention defined in claim 2 in which said sealing means comprises a sealing including an annulus disposed about the peripheral port of each of said discs.

4. A valve comprising, in combination:
   a valve body defining a cylindrical valve cavity opening at an upper and a lower annular rim, at least two ports spaced around the periphery of said valve body and each affording communication to said cavity;
   a bottom cover having an upper face and a lower face; and
   means in the form of a set of multilevel conformations alike in form and dimension at the upper face of said bottom cover and at said upper annular rim, and in the form of a set of multilevel conformations formed at the upper face of said bottom cover for closing the lower end of said cavity with said bottom cover;
   said valve body being provided with an even number of ports and in which said valve core comprises spaced disks arranged for rotation together on the axis of said cavity and a dividing wall interconnecting said disks and extending from wall to wall of said cavity such as to divide said cavity into two cavities each of which, in one rotational position of said dividing wall, opens to at least one port to which the other does not open.

5. The invention defined in claim 2 in which said valve body is provided with at least two ports and in which said interconnecting wall is disposed parallel to, but spaced from, a plane through the axis of the cavity such that, in one rotational position of the valve core, one of said ports is isolated from communication with the second and third ones of said ports and such that, in a second rotational position of the valve core, the second of said ports is isolated from communication with the first and third ones of said ports.

6. The invention defined in claim 2 in which said sealing means comprises sealing members in the form of an annulus each encompassing the circumference of a respectively associated one of said discs and sealing strips each disposed along a respectively associated edge of said interconnecting wall between said annuluses.

* * * * *